(12) United States Patent
Habib et al.

(10) Patent No.: US 8,590,490 B2
(45) Date of Patent: Nov. 26, 2013

(54) CARBON-FREE FIRE TUBE BOILER

(75) Inventors: Mohamed Abdel-Aziz Habib, Dhahran (SA); Rached Ben-Mansour, Dhahran (SA)

(73) Assignee: King Fahd Univ. of Petroleum & Minerals, Dhahran (SA)

( * ) Notice: Subject to any disclaimer, the term of this patent is extended or adjusted under 35 U.S.C. 154(b) by 459 days.

(21) Appl. No.: 12/656,898

(22) Filed: Feb. 18, 2010

(65) Prior Publication Data

US 2011/0132280 A1 Jun. 9, 2011

(51) Int. Cl.
*F22B 13/04* (2006.01)

(52) U.S. Cl.
USPC .......................................... 122/149; 122/51

(58) Field of Classification Search
None
See application file for complete search history.

(56) References Cited

U.S. PATENT DOCUMENTS

| | | | |
|---|---|---|---|
| 3,153,429 A | 10/1964 | Palm | |
| 3,241,529 A | 3/1966 | Blockley et al. | |
| 4,195,596 A * | 4/1980 | Scheifley et al. | 122/149 |
| 5,643,354 A | 7/1997 | Agrawal et al. | |
| 5,657,624 A | 8/1997 | Kang et al. | |
| 5,702,999 A | 12/1997 | Mazanee et al. | |
| 5,820,655 A | 10/1998 | Gottzmann et al. | |
| 5,855,648 A | 1/1999 | Prasad et al. | |
| 5,865,878 A | 2/1999 | Drnevich et al. | |
| 5,964,922 A | 10/1999 | Keskar et al. | |
| 6,071,116 A | 6/2000 | Philippe et al. | |
| 6,139,810 A | 10/2000 | Gottzmann et al. | |
| 6,149,714 A | 11/2000 | Kobayashi | |
| 6,153,163 A | 11/2000 | Prasad et al. | |
| 6,293,084 B1 | 9/2001 | Drnevich et al. | |
| 6,360,524 B1 | 3/2002 | Drnevich et al. | |
| 6,375,913 B1 | 4/2002 | Albaugh et al. | |
| 6,394,043 B1 * | 5/2002 | Bool et al. | 122/488 |
| 6,499,300 B2 | 12/2002 | Griffin et al. | |
| 6,505,467 B1 * | 1/2003 | Fjellhaug et al. | 60/780 |
| 6,539,719 B2 * | 4/2003 | Prasad et al. | 60/649 |
| 6,562,104 B2 | 5/2003 | Bool, III et al. | |
| 6,565,632 B1 | 5/2003 | Van Hassel et al. | |
| 6,702,570 B2 | 3/2004 | Shah et al. | |
| 6,921,596 B2 | 7/2005 | Kelly et al. | |
| 7,125,528 B2 | 10/2006 | Besecker et al. | |
| 7,160,357 B2 | 1/2007 | Gotzmann | |
| 7,335,247 B2 | 2/2008 | Stein et al. | |
| 7,384,452 B2 * | 6/2008 | Sirman et al. | 95/54 |
| 7,549,400 B2 | 6/2009 | Chakravarthy et al. | |
| 7,556,675 B2 | 7/2009 | Carolan et al. | |

FOREIGN PATENT DOCUMENTS

WO WO 9910945 3/1999
WO WO 03107463 12/2003

* cited by examiner

*Primary Examiner* — Kang Hu
*Assistant Examiner* — John Bargero
(74) *Attorney, Agent, or Firm* — Richard C. Litman

(57) ABSTRACT

The carbon-free fire tube boiler is a boiler for heating water by combustion of hydrocarbon fuels with oxygen. The boiler includes a housing defining first and second heat transfer stages. At least one oxygen transport reactor is received within the first heat transfer stage. The oxygen transport reactor includes an outer wall and an inner cylindrical ion transport membrane. The membrane receives pressurized air and separates gaseous oxygen therefrom, transporting the oxygen into an annular region between the membrane and the outer wall. The gaseous hydrocarbon fuel is delivered into the annular region for combustion, producing gaseous carbon dioxide and water vapor. A water reservoir is defined within the first and second stages, with the at least one oxygen transport reactor and at least one transfer tube passing therethrough. The carbon dioxide and the water vapor are delivered through the at least one transfer tube for heating water contained therein.

7 Claims, 3 Drawing Sheets

CARBON-FREE FIRE TUBE BOILER

BACKGROUND OF THE INVENTION

1. Field of the Invention

The present invention relates generally to energy generation, and particularly to a carbon-free fire tube boiler that minimizes carbon dioxide exhaust into the environment.

2. Description of the Related Art

A boiler is a closed vessel in which water or other fluid is heated. The heated or vaporized fluid exits the boiler for use in various processes or heating applications. A fire tube boiler is a type of boiler in which hot gases from a fire pass through one or more tubes running through a sealed container of water. The heat energy from the gases passes through the sides of the tubes by thermal conduction, convection and radiative heat transfer, heating the water and ultimately creating steam.

Fire tube boilers are well known, particularly since steam locomotives used fire tube boilers as their source of propulsion. In the locomotive-type boiler, fuel is burned in a firebox to produce hot combustion gases. The firebox is surrounded by a cooling jacket of water connected to the long, cylindrical boiler shell. The hot gases are directed along a series of fire tubes, or flues, that penetrate the boiler and heat the water thereby generating saturated steam. The steam rises to the highest point of the boiler, i.e., the "steam dome", where it is collected. The dome is the site of the regulator that controls the exit of steam from the boiler.

In the fire tube boiler, the saturated steam is very often passed into a superheater, back through the larger flues at the top of the boiler, to dry the steam and heat it to superheated steam. The superheated steam is directed to an industrial process or, very rarely, to a turbine to produce mechanical work. Exhaust gases are fed out through a chimney, and may be used to pre-heat the feed water to increase the efficiency of the boiler.

Such steam-based sources of mechanical power have been adapted to a wide variety of fields. However, despite their myriad uses, fire tube boilers typically produce great quantities of exhaust, particularly due to their primary reliance upon the combustion of fossil fuels. It would be desirable to provide the great adaptability, and relative simplicity, of the fire tube boiler without the production of environmentally harmful exhaust products.

Thus, a carbon-free fire tube boiler solving the aforementioned problems is desired.

SUMMARY OF THE INVENTION

The carbon-free fire tube boiler is a boiler for heating water by combustion of hydrocarbon fuels with oxygen. The carbon-free fire tube boiler includes a housing defining first and second heat transfer stages therein. At least one oxygen transport reactor is received within the first heat transfer stage of the housing.

The at least one oxygen transport reactor includes an outer wall defining an open interior region therein, and an inner cylindrical ion transport membrane coaxially received within the open interior region. The inner cylindrical ion transport membrane is adapted for receiving pressurized air within a central region thereof and further separating gaseous oxygen from the pressurized air and transporting the gaseous oxygen into an annular region defined between the inner cylindrical ion transport membrane and an inner surface of the outer wall.

The gaseous fuel is delivered into the annular region of the at least one oxygen transport reactor for combustion thereof with the separated gaseous oxygen, thus producing gaseous carbon dioxide and water vapor. A water reservoir is defined within the second stage, with the water reservoir being adapted for receiving liquid water.

At least one transfer tube passes through the water reservoir, with the at least one transfer tube being formed of a thermally conductive material. The gaseous carbon dioxide and the water vapor are delivered through the at least one transfer tube for heating the water contained within the water reservoir.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
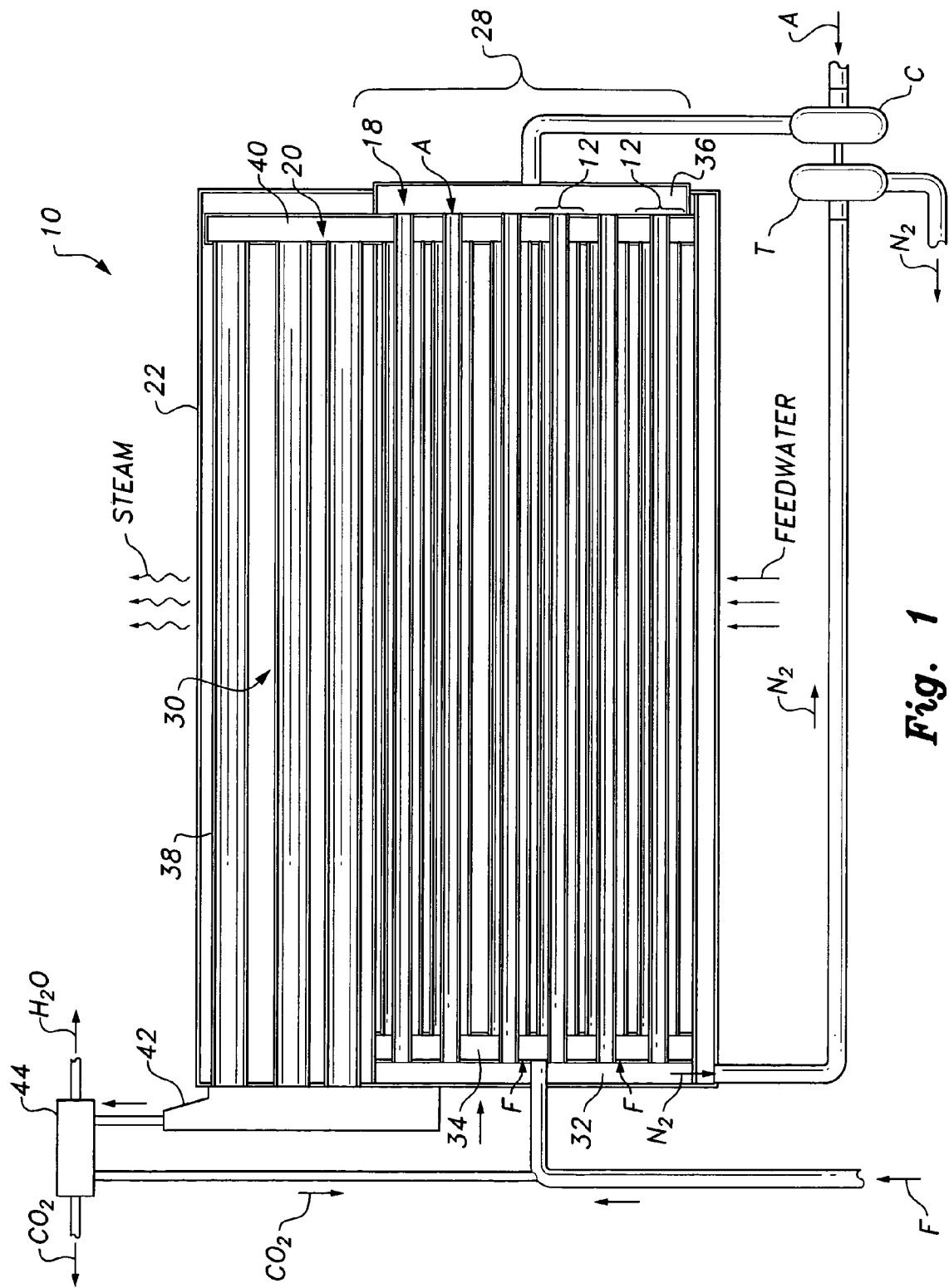
FIG. 1 is schematic diagram of a carbon-free fire tube boiler according to the present invention.
Figure 3:
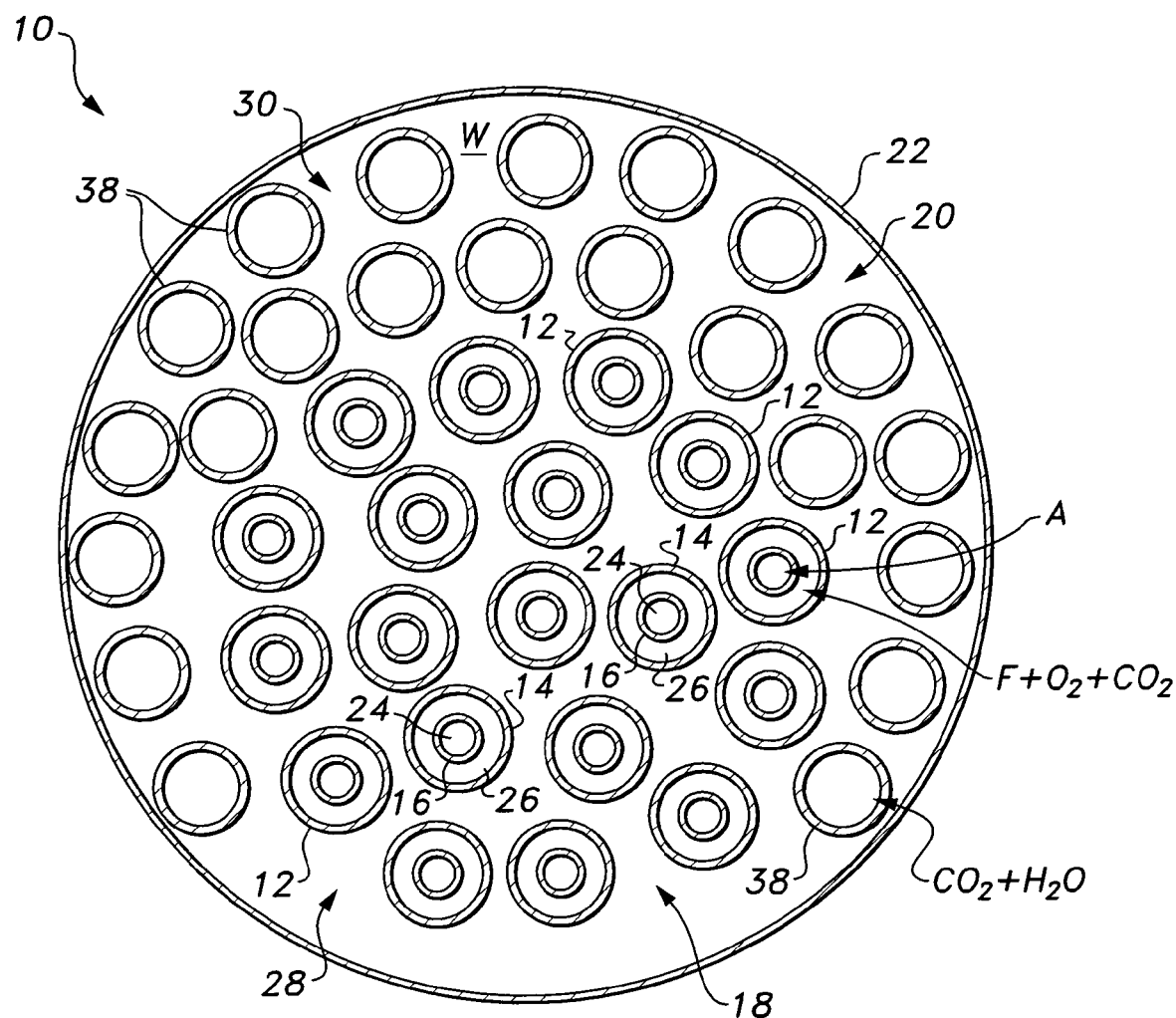
FIG. 3 is a side diagrammatic view of the carbon-free fire tube boiler according to the present invention.

FIGS. 1 and 3 diagrammatically illustrate the carbon-free fire tube boiler 10. As best shown in FIG. 1, housing 22 contains a first stage 18 and a second stage 20. As will be described in detail below, within first stage 18, fuel F, which may be natural gas or any other type of hydrocarbon fuel combustible with oxygen, is combusted with oxygen gas (denoted hereinafter as $O_2$) obtained from environmental air A, resulting in gaseous carbon dioxide (denoted hereinafter as $CO_2$) and water vapor (denoted hereinafter as $H_2O$).

Figure 2:
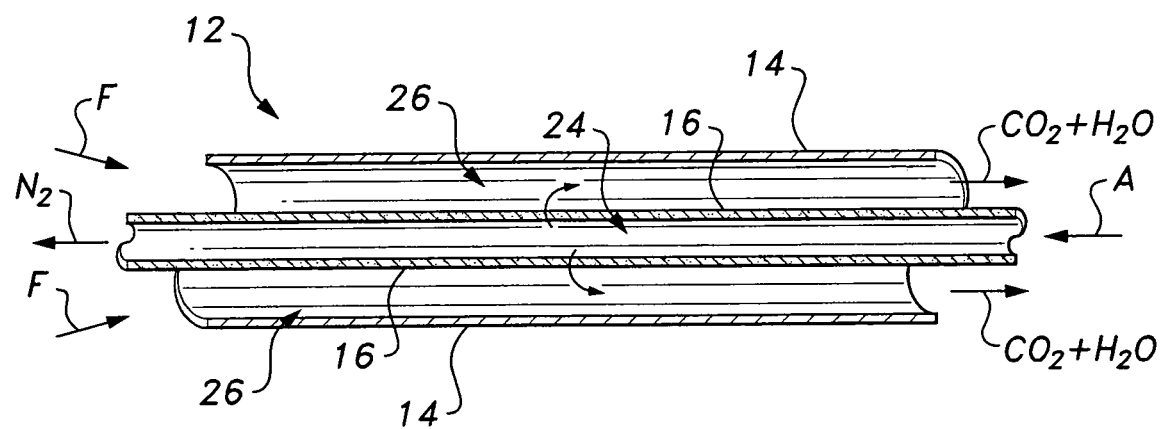
FIG. 2 is a side diagrammatic view of an oxygen transport reactor of the carbon-free fire tube boiler according to the present invention.

First stage 18 includes a plurality 28 of oxygen transport reactors (OTRs) 12. As shown in FIGS. 2 and 3, each OTR 12 is preferably cylindrical, including an outer cylindrical wall 14 with an inner cylindrical ion transport membrane 16 positioned coaxially therein. Each OTR 12 in the first stage group 28 is surrounded by water within water reservoir 30. Heat transfer occurs from each OTR to the water W. As shown in FIGS. 1 and 2, environmental air A is pumped within central regions 24 of each OTR 12, with each central region 24 being defined by the cylindrical shell of the respective inner cylindrical ion transport membrane 16.

Gaseous hydrocarbon fuel is pumped into annular region 26, defined by the inner cylindrical ion transport membrane 16 and the inner surface of outer wall 14 of each OTR 12. The inner cylindrical ion transport membrane 16 separates $O_2$ from air A, allowing only $O_2$ to pass therethrough, from central region 24 to annular region 26. Oxygen permeable membranes are well known in the art, and any suitable type of membrane that allows only the gaseous $O_2$ to flow therethrough (and only in the outward direction; i.e., from central region 24 to annular region 26) may be utilized.

The gaseous $O_2$ is transported from central region 24 to the surface of the inner cylindrical ion transport membrane 16, external to membrane 16, for combustion with fuel F within the annular region 26. This combustion results in the production of gaseous $CO_2$ and $H_2O$ vapor. As shown in FIGS. 1 and 3, the second stage 20 includes a water reservoir 30, containing liquid water W, which is preferably contained within housing 22. Preferably, each wall 14 of OTRs 12 is formed from a thermally conductive material, such as steel, for example, and each of the OTRs 12 of the plurality 28 (i.e., the first stage) are held within the water reservoir 30. Combustion of the fuel F with the $O_2$ within each OTR 12 generates heat, which is transferred into liquid water W through thermally conductive annular wall 14. As shown in FIG. 1, gaseous nitrogen (denoted hereinafter as $N_2$), which remains after the $O_2$ is removed from the air A, is channeled to a reservoir 32, where it is then drawn off for driving an external turbine T.

As illustrated in FIG. 1, both fuel F and air A are delivered into OTRs 12 of first stage 18 by gas distributors 34, 36, respectively. It should be understood that any suitable type of pumping and distribution of fuel F and air A may be utilized. Preferably, air A is provided as compressed air, compressed by a compressor C, and delivered to gas distributor 36. Complex gas flows may be generated within each OTR 12 by gas distributors 34, 36. For example, air A may be driven into each central region 24 so as to flow in a counter-clockwise direction, for example, with the gaseous fuel F being driven to flow in a clockwise direction within the annular region 26, thus ensuring a uniform temperature along the surface of membrane 16 to enhance the combustion process stability.

As shown in FIG. 1, the gaseous $CO_2$ and $H_2O$ vapor produced by combustion within OTRs 12 is collected in chamber 40 and delivered to a plurality of transfer tubes 38, contained within second stage 20 and passing through liquid water W contained within water reservoir 30. Each transfer tube 38 is a conduit preferably formed from a thermally conductive material, such that the gaseous $CO_2$ and $H_2O$ vapor are cooled therein as they pass therethrough, with further heat transfer taking place through tubes 38 to further heat liquid water W.

The cooled gaseous $CO_2$ and $H_2O$ vapor are delivered by tubes 38 to a stack 42, mounted external to housing 22, which allows passage thereof to a heat exchanger 44. It should be understood that any suitable type of heat exchanger may be utilized, and any suitable type of pump or the like may be used to draw the gaseous $CO_2$ and $H_2O$ vapor into heat exchanger 44. Thermal energy is extracted from the gaseous $CO_2$ and $H_2O$ vapor (converting the water vapor into liquid water), and the liquid water may then be extracted.

The $CO_2$ is preferably recycled, with the $CO_2$ being delivered to gas distributor 34. The $CO_2$ is recycled so as to minimize carbon dioxide emission into the environment, as well as providing a purge of oxygen, ensuring low partial pressure of $O_2$ within annular regions 26 of OTRs 12. This allows the ratio of partial pressures of $O_2$ across membrane 16 to remain high in order to enhance the process of separation of $O_2$ from air A, thus increasing $O_2$ flux rate through membrane 16.

The continuous combustion of fuel F with $O_2$, as it transports through membrane 16, results in a continuous low partial pressure of $O_2$ at the outer surface of membrane 16. Thus, the ratio of the partial pressure of the $O_2$ across the sides of membrane 16 remains high, ensuring a high flux rate of oxygen separation.

As noted above, the remaining $N_2$, following combustion, is collected within chamber 32. Because air A is pressurized as it enters each OTR 12, the $N_2$ will have a relatively high pressure. The pressurized $N_2$ is passed to turbine T and is used to drive turbine T, as shown in FIG. 1. Turbine T at least partially drives compressor C, which drives the pressurized air A into distributor 36, for delivering the air A into the central region 24 of each OTR 12.

It should be noted that the fuel F combusts with pure oxygen within annular regions 26, rather than mixed air A, thus resulting in increased temperatures of the exhaust gases (i.e., the $CO_2$ and water vapor produced by combustion). The heat produced by the combustion process is transferred to liquid water W within water reservoir 30, both through conduction through wall 14, and through conduction through tubes 38 as the gases flow in the second pass. The boiling of water W that takes place within reservoir 30 may then be used as a source of energy, as is well known in conventional boilers, with steam produced thereby being used as a pressurized drive source. Additional energy is extracted by heat exchanger 44, and may be drawn off and utilized in any conventional manner. Housing 22 may further include an inlet port, allowing for a fresh supply of water W to be injected therein, and an outlet port, for the extraction of the produced pressurized steam, for coupling with an external pressure-driven load.

It is to be understood that the present invention is not limited to the embodiments described above, but encompasses any and all embodiments within the scope of the following claims.

We claim:
1. A carbon-free fire tube boiler, comprising:
a housing having first and second heat transfer stages defined therein;
at least one oxygen transport reactor disposed within the first heat transfer stage of the housing, the at least one oxygen transport reactor having an outer wall defining an open interior region therein and an inner cylindrical ion transport membrane coaxially disposed within the open interior region, the inner cylindrical ion transport membrane being adapted for receiving pressurized air within a central region thereof, for separating gaseous oxygen from the pressurized air, and for transporting the gaseous oxygen into an annular region defined between the inner cylindrical ion transport membrane and an inner surface of the outer wall;
means for delivering gaseous fuel into the annular region of the at least one oxygen transport reactor for combustion thereof with the separated gaseous oxygen, producing gaseous carbon dioxide and water vapor;
a water reservoir defined within the first and second heat transfer stages, the water reservoir being adapted for receiving liquid water, the at least one oxygen transport reactor passing through the water reservoir in the first heat transfer stage;
at least one transfer tube passing through the water reservoir in the second heat transfer stage, the at least one transfer tube being formed of a thermally conductive material;
means for passing the gaseous carbon dioxide and the water vapor through the at least one transfer tube for heating water contained within the water reservoir by initial extraction of thermal energy from the gaseous carbon dioxide and the water vapor;
a heat exchanger;
means for transferring the gaseous carbon dioxide and the water vapor from the at least one transfer tube to the heat exchanger for further extraction of thermal energy therefrom and separation of the gaseous carbon dioxide from the water vapor, wherein the water vapor is condensed into liquid water and output; and
means for delivering the gaseous carbon dioxide from the heat exchanger to the means for delivering the gaseous fuel for recycling thereof, whereby heating of the water in the water reservoir is accomplished by the carbon-free fire tube boiler without releasing external carbon dioxide emissions.

2. The carbon-free fire tube boiler as recited in claim 1, wherein said means for delivering the gaseous fuel comprises a fuel distributor.

3. The carbon-free fire tube boiler as recited in claim 2, further comprising a nitrogen receiving chamber for receiving pressurized nitrogen gas separated from the pressurized air in said at least one oxygen transport reactor.

4. The carbon-free fire tube boiler as recited in claim 3, further comprising a turbine in communication with the nitrogen receiving chamber, the turbine being driven by pressurized nitrogen gas.

5. The carbon-free fire tube boiler as recited in claim 4, further comprising an air compressor at least partially driven by the turbine, the air compressor producing the pressurized air fed into the at least one oxygen transport reactor.

6. The carbon-free fire tube boiler as recited in claim 5, wherein the at least one oxygen transport reactor comprises a plurality of oxygen transport reactors.

7. The carbon-free fire tube boiler as recited in claim 6, wherein the outer wall of each said oxygen transport reactor is formed from thermally conductive material.

\* \* \* \* \*